(12) United States Patent
Jagota

(10) Patent No.: US 11,436,233 B2
(45) Date of Patent: Sep. 6, 2022

(54) GENERATING ADAPTIVE MATCH KEYS

(71) Applicant: salesforce.com, inc., San Francisco, CA (US)

(72) Inventor: Arun Kumar Jagota, Sunnyvale, CA (US)

(73) Assignee: Salesforce, Inc., San Francisco, CA (US)

(*) Notice: Subject to any disclaimer, the term of this patent is extended or adjusted under 35 U.S.C. 154(b) by 383 days.

(21) Appl. No.: 16/258,217

(22) Filed: Jan. 25, 2019

(65) Prior Publication Data

US 2020/0242112 A1   Jul. 30, 2020

(51) Int. Cl.
| | | |
|---|---|---|
| G06F 16/2457 | (2019.01) | |
| G06F 16/901 | (2019.01) | |
| G06F 16/28 | (2019.01) | |
| G06F 16/22 | (2019.01) | |

(52) U.S. Cl.
CPC ...... *G06F 16/2457* (2019.01); *G06F 16/2282* (2019.01); *G06F 16/284* (2019.01); *G06F 16/9024* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Thu N Nguyen
(74) *Attorney, Agent, or Firm* — Dergosits & Noah LLP; Todd A. Noah

(57) ABSTRACT

A system creates graph of nodes connected by edges. Each node represents corresponding value of corresponding attribute and is associated with count of corresponding value. Each edge is associated with count of instances that values represented by corresponding connected nodes are associated with each other. The system identifies each node associated with first count as first set of keys, and deletes each node associated with first count. The system identifies each edge associated with second count as second set of keys, and deletes each edge associated with second count. The system identifies each node associated with third count as third set of keys, and deletes each node associated with third count. The system identifies each edge associated with fourth count as fourth set of keys, and deletes each edge associated with fourth count. The system uses each set of keys to search and match records.

20 Claims, 9 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,026 B1 * | 6/2003 | Cranston ............ G06F 16/24557 707/696 |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0122837 A1 * | 6/2004 | Lee ..................... G06F 16/2246 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0370644 A1 * | 12/2015 | Graefe ................ G06F 11/1469 707/624 |
| 2016/0203327 A1 * | 7/2016 | Akkiraju ............. G06F 21/6218 707/785 |
| 2016/0364468 A1 * | 12/2016 | Huang .................. G06F 16/285 |
| 2019/0079960 A1 * | 3/2019 | Cao ..................... G06F 16/2315 |
| 2019/0155924 A1 * | 5/2019 | Guggilla ................ G06F 16/84 |

* cited by examiner

GENERATING ADAPTIVE MATCH KEYS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data can become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications. The master profile construction process involves using match keys to match specific fields of customer data records, followed by clustering sets of customer records for the same customers, and finally by merging the clusters to create master profiles. For example, a cluster contains 5 records for the same customer, comprised of 3 distinct given name field values, such as R., Robert, and Bob. The merging process determines which of these three values (or possibly some other value) should be listed as the given name in the customer's master profile.

A database system's process that determines whether any existing records sufficiently match any other existing database records could be an intensive process that matches multiple values between these records, thereby consuming a significant amount of system resources. The reason that such a matching process would be intensive is that any particular record would need to be matched against all of the records, which is possibly millions of records. Since this matching would need to be done for every record, the matching process could include millions times millions of potential matches. Consequently, a database system can initially identify any existing database records that match only one or two corresponding values stored by an existing record in a shallow matching process that consumes a relatively limited amount of system resources. Shallow matching takes a given record and narrows down records that potentially match the given record from the full set of records to a very small set of potentially matching records. Therefore, shallow matching of records is faster because index lookups narrows the potential match candidates. Non-candidate records are not matched at all by shallow matching or deep matching. Then the database system can apply an intensive multiple-value matching process to each of the relatively small number of shallow matching records in the existing database records, thereby collectively reducing system resource consumption.

The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively.

A database system's process that determines whether newly received database records sufficiently match existing database records could be an intensive process that matches multiple values between these records, because the number of existing database records may be very large, even if there are only a few newly received records in any given time period, thereby consuming a significant amount of system resources. Consequently, a database system can initially identify any existing database records that match only one or two corresponding values stored by a newly received database record in a shallow matching process that consumes a relatively limited amount of system resources. Then the database system can apply an intensive multiple-value matching process to each of the relatively small number of shallow matching database records in the existing database records, thereby collectively reducing system resource consumption.

Therefore, the database system can create match keys from values stored by existing database records and/or by newly received database records, and then use the match keys to identify the existing database records that shallow match and/or newly received database records. The design of match keys takes recall and performance into consideration. Recall is the percentage of actual matching records that are identified by a database system. To achieve the ideal of 100% recall, a database system may need to treat every existing record in the database as a candidate for matching every other existing database record or every newly received database record, which typically is not feasible, performance-wise. At the other extreme of the recall/performance spectrum, a database system can quickly search database records by using narrowly focused match keys, but narrowly focused match keys may fail to identify some matching database records.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

In accordance with embodiments described herein, there are provided methods and systems for generating adaptive match keys. A system creates a graph of nodes connected by edges. Each node represents a corresponding value of a corresponding attribute and is associated with a count of the corresponding value. Each edge is associated with a count of instances that values represented by corresponding connected nodes are associated with each other. The system identifies each node associated with a first count as a first set of keys, and deletes each node associated with the first count. The system identifies each edge associated with a second count as a second set of keys, and deletes each edge associated with the second count. The system identifies each node associated with a third count as a third set of keys, and deletes each node associated with the third count. The system identifies each edge associated with a fourth count as a fourth set of keys, and deletes each edge associated with the fourth count. The system uses each set of keys to search and match records.

Figure 1A:
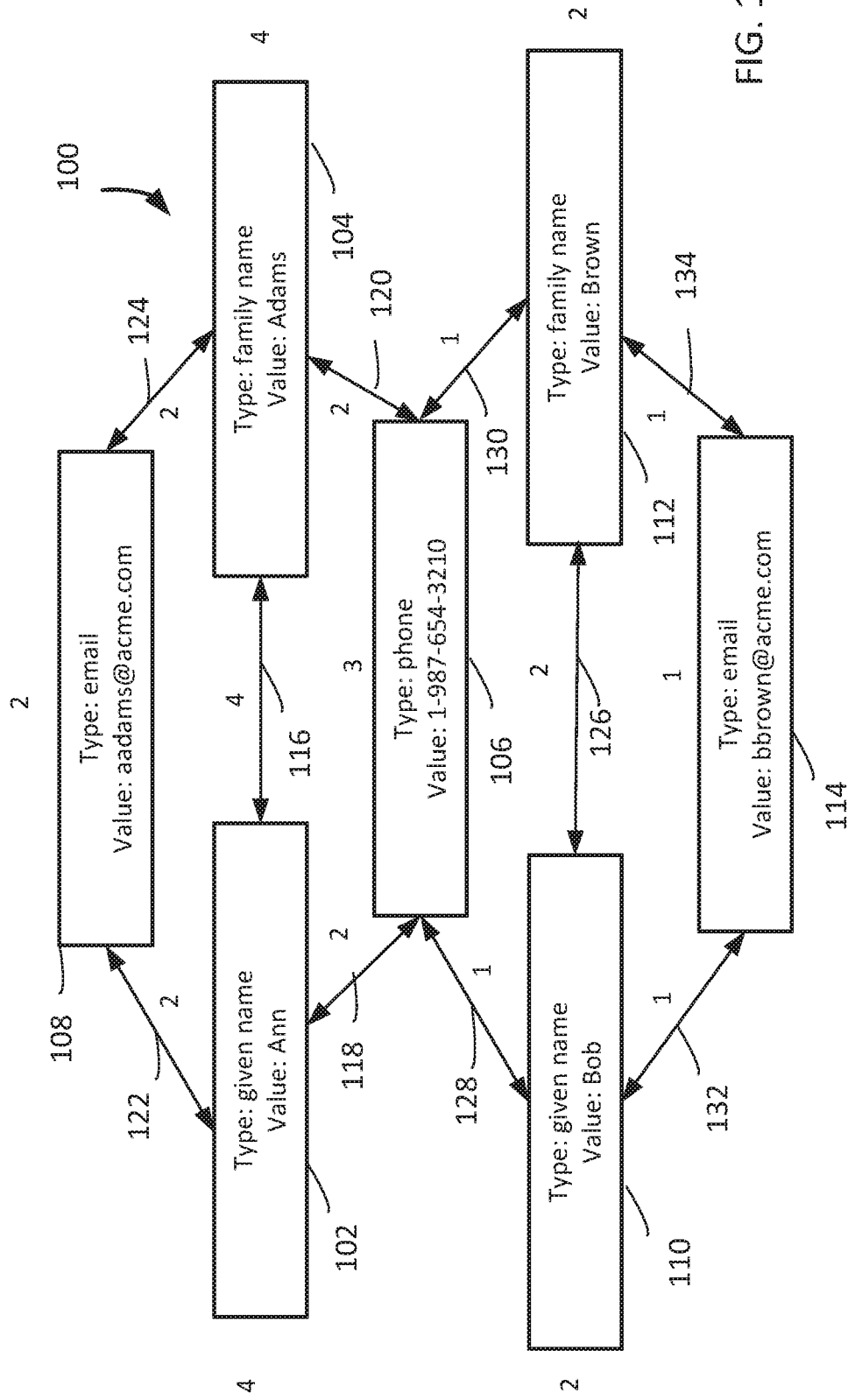
FIGS. 1A-F illustrate example data structures used for generating adaptive match keys, in an embodiment.

For example, after Acme Corporation employees Ann Adams and Bob Brown enter their names and Acme email address or Acme's main phone number each time that they visit MegaCorp's marketing website and retail website, a customer resolution engine creates the graph depicted by FIG. 1A. One node represents "Bob" as Bob Brown's given name, and has the weight of 2, which is the number of times that Bob Brown entered his given name when visiting a MegaCorp website. One edge has the weight of 4, which is the number of times that Ann Adams entered her name when visiting a MegaCorp website. The customer resolution engine identifies the node representing Bob Brown's email address as the match key {bbrown@acme.com} because this node has the weight of 1, and then deletes this node and its edges. The customer resolution engine identifies the edge connecting the node representing Bob Brown's given name with the node representing Acme's main phone number as the match key {Bob, 1-987-654-3210} and the edge connecting the node representing Bob Brown's family name with the node representing Acme's main phone number as the match key {Brown, 1-987-654-3210} because these edges have the weight of 1, and then deletes these edges. The customer resolution engine identifies the node representing Ann Adams' email address as the match key {aadams@acme.com}, Bob Brown's given name as the match key {Bob}, and Bob Brown's family name as the match key {Brown} because these nodes have the weight of 2, and then deletes these nodes. The customer resolution engine identifies the edge connecting the node representing Ann Adams' given name with the node representing Acme's main phone number as the match key {Ann, 1-987-654-3210} and the edge connecting the node representing Ann Adams' family name with the node representing Acme's main phone number as the match key {Adams, 1-987-654-3210} because these edges have the weight of 2, and then deletes these edges. The customer resolution engine can identify the node representing Acme's main phone number as the match key {1-987-654-3210} because this node has the weight of 3, and then delete this node. The customer resolution engine can identify the node representing Ann Adams's given name as the match key {Ann} and the node representing Ann Adams's family name as the match key {Adams} because these nodes have the weight of 4, and then deletes these nodes and their edge. The customer resolution engine uses only the match key {bbrown@acme.com} of the match keys {bbrown@acme.com}, {Bob, 1-987-654-3210}, {Brown, 1-987-654-3210}, {aadams@acme.com}, {Bob}, {Brown}, {Ann, 1-987-654-3210}, {Adams, 1-987-654-3210}, {1-987-654-3210}, {Ann}, and {Adams} to efficiently search and match MegaCorp's existing records for Bob Brown when Bob Brown enters his name and email address when visiting MegaCorp's customer service website. The customer resolution engine generates match keys that have a near-perfect recall (they almost never miss any matches) while being orders of magnitude faster than a naive approach that would deep-match all pairs of database records.

Systems and methods are provided for generating adaptive match keys. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a data structure for generating adaptive match keys. Next, methods and systems for generating adaptive match keys will be described with reference to example embodiments.

While one or more implementations and techniques are described with reference to an embodiment in which generating adaptive match keys is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A customer resolution engine can cleanse, normalize, and enrich customer data as needed. For example, a traditional match rule for uniquely identifying a person may process the data set that includes "John Smith/1 Main St, San Francisco, Calif. 94105" and "John Smith/11 Main St, San Francisco, Calif. 94105," and identify two unique people. While a traditional match rule can match addresses by using "fuzzy" strings, in isolation this fuzzy matching can lead to false positives, as there could be two different John Smiths at different addresses. In contrast, the customer resolution engine can more intelligently apply matching rules by incorporating customer data reliability into the matching process. For this example, the customer resolution engine captures and leverages data validation and enrichment attributes as part of the attributes to determine that "11 Main St" is not a valid street address for "San Francisco, Calif. 94105," infer a data entry error in the street number, and then identify the nearest string or geo-proximity match as a reliable candidate, thereby identifying only one unique John Smith on Main Street in San Francisco.

The customer resolution engine can use a similar approach in assessing reliability of an attribute value for uniqueness. For example, a traditional match rule "Name AND (Phone Number OR Email)" would process the data set that includes "John Smith/415-555-1212/john.smith@gmail.com," "John Smith/415-555-1212/john smith@gmail.com," and "Cary Jones/415-555-1212/cary@joneses.com," and then identify two unique people, John Smith and Cary Jones. In contrast, the customer resolution engine can more intelligently apply matching rules by identifying how many unique source records, names, and email addresses relate to any given phone number, or vice versa. By identifying that a specific phone number is commonly used across many records, where other match condition attributes did not match, such as name and email address, the customer resolution engine can apply a matching rule that processes the specific phone number as a shared attribute value, which is not a unique attribute value, thereby identifying two unique John Smiths who share the phone number 415-555-1212.

The customer resolution engine processes database records that have n attributes, referred to as $X_1, X_2, \ldots X_n$, with each attribute having its own discrete set of values referred to as $V_1, V_2, \ldots V_n$. Examples of attributes include first_name, last_name, phone number, and city. Numeric attributes are assumed to have been suitably discretized. The customer resolution engine generates an n-partite graph whose nodes partition into $V_1, V_2, \ldots V_n$, where $V_i$ denotes the set of values of attribute $X_i$. The customer resolution engine does not connect nodes in the same part by an edge, due to the constraint that in any given database record and for any i, $X_i$ takes on at most one value from $V_i$. $X_i$ may not take on any value in a given database record.

The weight on node v is the number of database records in a given set S that contain the attribute: value pair associated with the node v. The weight on edge {u, v} is the number of database records in S that contain the attribute: value pair associated with both of the nodes u and v. The customer resolution engine can efficiently compute the weights on all the nodes and the edges of the graph in one pass over the data set. When the customer resolution engine encounters a new database record, the customer resolution engine increments by 1 the weights of the nodes and edges that correspond to the new database record. A clique can be a set of one or more nodes where each pair of nodes is connected by an edge. A clique's weight can be the sum of the weights of the nodes and the edges in the clique.

FIGS. 1A-D depict graphs that the customer resolution engine generates based on the following example database records. After Acme Corporation employee Ann Adams enters her name and Acme's main phone number while visiting MegaCorp's marketing website, the database system creates the first database record that stores "Ann," "Adams," and "1-987-654-3210." Following Ann Adams entering her name and Acme email address while visiting MegaCorp's retail website, the database system creates the second database record that stores "Ann," "Adams," and "aadams@acme.com." When Acme Corporation employee Bob Brown enters his name and Acme's main phone number while visiting MegaCorp's marketing website, the database system creates the third database record that stores "Bob," "Brown," and "1-987-654-3210." After Bob Brown enters his name and Acme email address while visiting MegaCorp's retail website, the database system creates the fourth database record that stores "Bob," "Brown," and "bbrown@acme.com." Following Ann Adams entering her name and Acme's main phone number while visiting MegaCorp's marketing website again, the database system creates the fifth database record that stores "Ann," "Adams," and "1-987-654-3210." When Ann Adams enters her name and Acme email address while visiting MegaCorp's retail website again, the database system creates the sixth database record that stores "Ann," "Adams," and "aadams@acme.com."

Continuing this example, the customer resolution engine generates the graph 100 based on these six database records, as depicted by FIG. 1A. The graph 100 includes nodes representing attribute values and edges connecting the nodes, with each edge representing a number of instances that one connected node's attribute value is associated with the other connected node's attribute value. For example, the graph 100 includes the given name node 102 that represents the attribute value "Ann," the family name node 104 that represents the attribute value "Adams," the phone node 106 that represents the attribute value "1-987-654-3210," and the email node 108 that represents the attribute value "aadams@acme.com." The graph 100 also includes the given name node 110 that represents the attribute value "Bob," the family name node 112 that represents the attribute value "Brown," and the email node 114 that represents the attribute value "bbrwon@acme.com."

The weight of 4 for the node 102 represents the 4 instances that "Ann" is stored by the 6 database records, the weight of 4 for the node 104 represents the 4 instances that "Adams" is stored by the 6 database records, the weight of 3 for the node 106 represents the 3 instances that "1-987-654-3210" is stored by the 6 database records, and the weight of 2 for the node 108 represents the 2 instances that "aadams@acme.com" is stored by the 6 database records. Similarly, the weight of 2 for the node 110 represents the 2 instances that "Bob" is stored by the 6 database records, the weight of 2 for the node 112 represents the 2 instances that "Brown" is stored by the 6 database records, and the weight of 1 for the node 114 represents the 1 instance that "bbrown@acme.com" is stored by the 6 database records.

The edge 116 connects the nodes 102 and 104, and has a weight of 4 that represents the 4 instances of "Ann" and "Adams" being stored together in the 6 database records; the edge 118 connects the nodes 102 and 106, and has a weight of 2 that represents the 2 instances of "Ann" and "1-987-654-3210" being stored together in the 6 database records, and the edge 120 connects the nodes 104 and 106, and has a weight of 2 that represents the 2 instances of "Adams" and "1-987-654-3210" being stored together in the 6 database records. The edge 122 connects the nodes 102 and 108, and has a weight of 2 that represents the 2 instances of "Ann" and "aadams @ acme.com" being stored together in the 6 database records; and the edge 124 connects the nodes 104 and 108, and has a weight of 2 that represents the 2 instances of "Adams" and "aadams@acme.com" being stored together in the 6 database records.

The edge 126 connects the nodes 110 and 112, and has a weight of 2 that represents the 2 instances of "Bob" and "Brown" being stored together in the 6 database records; the edge 128 connects the nodes 110 and 106, and has a weight of 1 that represents the 1 instance of "Bob" and "1-987-654-3210" being stored together in the 6 database records, and the edge 130 connects the nodes 112 and 106, and has a weight of 1 that represents the 1 instance of "Brown" and "1-987-654-3210" being stored together in the 6 database records. The edge 132 connects the nodes 110 and 114, and has a weight of 1 that represents the 1 instance of "Bob" and "bbrown@acme.com" being stored together in the 6 database records; and the edge 134 connects the nodes 112 and 114, and has a weight of 1 that represents the 1 instances of "Brown" and "bbrown@acme.com" being stored together in the 6 database records. Although the graph 100 depicts nodes, edges, and weights for only four attributes (given name, family name, email, and phone) based on only six database records, the customer resolution engine can generate a graph that depicts nodes, edges, and weights for any number of attributes based on any number of database records.

Clustering analysis can be run on the graph to discover clusters of nodes which can be grouped together as a clique. These nodes can further be refined and analyzed to distill a master profile, which may be referred to as an entity 360 view, that can then be used for a number of business use cases. Any attribute value may be shared by multiple cliques. However, sharing, in general, is constrained to fairly tight social groups, such as a household, a company, roommates, etc. Since the main use case is to connect an attribute value to a small number of master profiles, any attribute value that has a high number of edges may be handled differently, such as by being removed from the graph. Consequently, the graph is a collection of many smaller cliques.

The graph may be an undirected, weighted, and colored data structure. The graph may be "undirected" because there is no directionality of the edges that represent relationships. All that is known is that attribute value A is connected to attribute value B, such as the given name "Ann" is connected to the family name "Adams." The graph may be "weighted" because some relationships between attribute values are stronger than other relationships between attribute values. For example, if the same email address and the same phone number are connected together by data from multiple sources, instead of adding multiple edges, the weight of the edge connecting the phone number and the email address is incremented. This weighting provides useful meta data for clustering algorithms. The graph may be "colored" because not all edges may be the same, as different edges may represent different types of relationships. For example, one edge may represent a business relationship, such as an edge that connects a customer's name to the customer's business email address, and another edge may represent a personal relationship, such as an edge that connects the customer's name to the customer's personal email address. Colored edges represent useful metadata for clustering and for constructing master profiles.

Since a set of one or more nodes represents a set of attributes taking on unique values from their value sets, the customer resolution engine generates each match key from a corresponding set of one or more nodes that forms a corresponding clique. The clique constraint increases the likelihood that the values go together, such that the values are not mutually incompatible. Generally speaking, the customer resolution engine favors smaller cliques over larger cliques because the smaller the clique, the fewer the attributes whose values are constrained, hence the higher its recall, which is the number of records found by a lookup on a match key. Since the data in a database record is often sparse, such that only a few values may be stored by the database record, the customer resolution engine may have no choice but to use small cliques as match keys. The customer resolution engine favors using lower-weight cliques, which is similar to "cherry-picking," over higher-weight cliques because using higher-weight cliques risks having too many records, which is not performant.

Once the customer resolution engine had identified a specific clique to be a match key, the customer resolution engine will discard all cliques that are proper supersets of the identified clique as candidates for being match keys because proper supersets of good match keys are redundant. A clique that has already been identified as a match key meets the necessary condition, such that a super set key can only have lower recall.

The customer resolution engine's algorithm inputs a support parameter W:
G=n-partite graph with node and edge weights.
A: for k=1 to n do//or stop before reaching n
Identify in G all k-node cliques of weight at most W
Delete the node of any identified single node clique from G
Delete one edge from each of any identified multiple node cliques from G.
If G is not empty, increase W and return to A.

Figure 2:
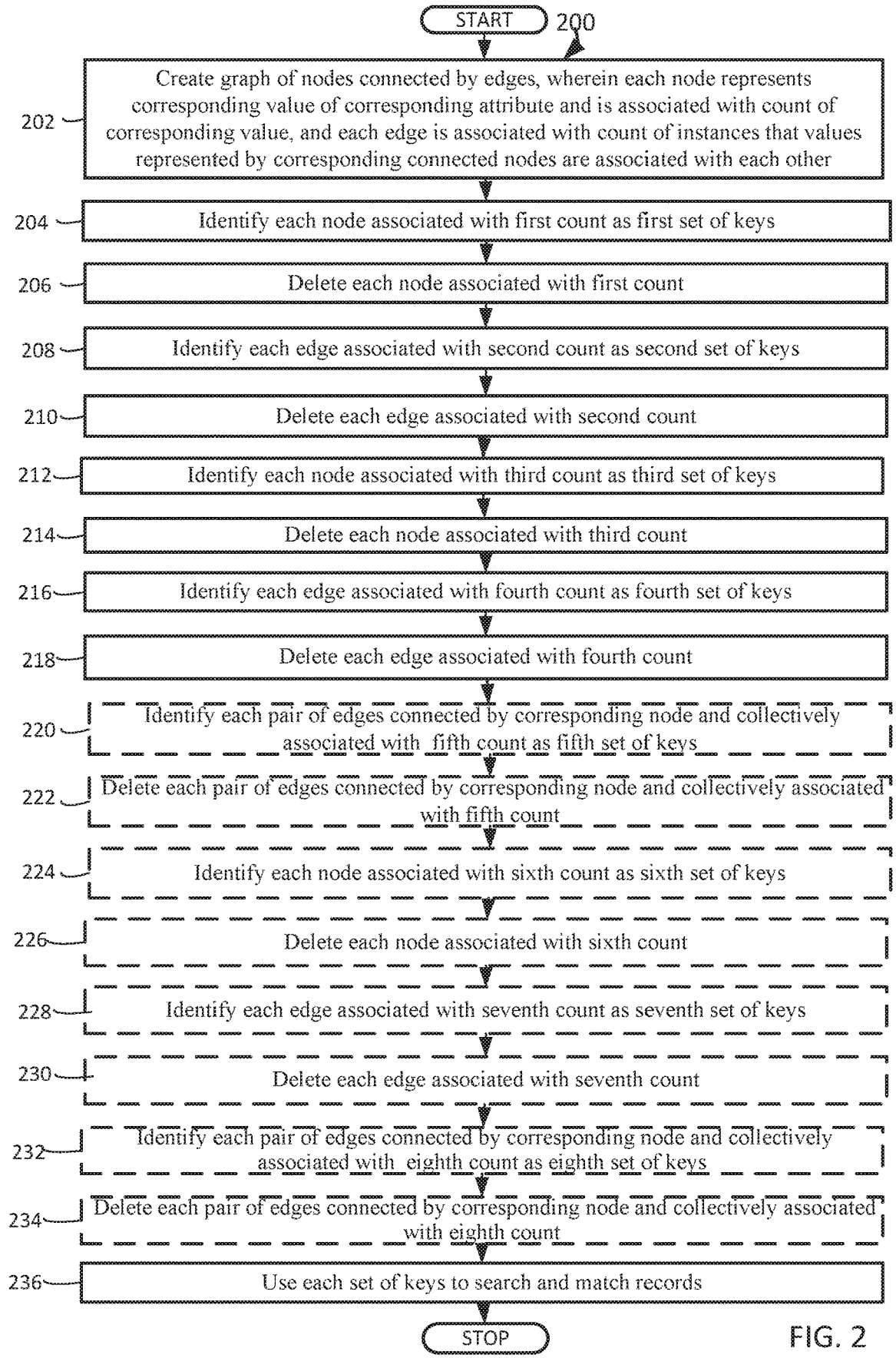
FIG. 2 is an operational flow diagram illustrating a high-level overview of a method for generating adaptive match keys, in an embodiment.

FIG. 2 is an operational flow diagram illustrating a high-level overview of a method 200 for generating adaptive match keys. A graph of nodes connected by edges is created, wherein each node represents a corresponding value of a corresponding attribute and is associated with a count of the corresponding value, and each edge is associated with a count of instances that values represented by corresponding connected nodes are associated with each other, block 202. The database system creates a graph of cliques that will be identified as matching keys. For example, and without limitation, this can include a customer resolution engine generating the graph 100 depicted by FIG. 1A, based on the six database records described above, which were created after Acme Corporation employees Ann Adams and Bob Brown entered their names and Acme email address or Acme's main phone number each time that they visited MegaCorp's marketing website and retail website. In the following examples, the graph 100 is a 4-partite graph because the graph 100 represents values for the 4 attributes given name, family name, phone, and email, such that the algorithm variable n equals 4.

A graph can be a diagram showing the relation between variable quantities. A node can be a point at which lines or pathways intersect or branch; a central or connecting point. An edge can be a line extending from one node to another node. A value can be a symbol on which operations are performed by a computer. An attribute can be a piece of information that determines the properties of a field in a database. A count can be an arithmetical value, expressed by a word, symbol, or figure, representing a particular quantity and used in making calculations. An instance can be an example or single occurrence of something. A connected node can be a point at which lines or pathways intersect or branch.

After creating a graph, each node associated with a first count is identified as a first set of keys, block 204. The database system identifies each single node clique with the weight of one as a match key. By way of example and without limitation, this can include the customer resolution engine identifying the node 114 with the weight of 1 as the match key {bbrown@acme.com}. A set can be zero or more things that belong or are used together. A key can be at least one field in a record that is used to lookup the record. When identifying the node 114 with the weight of 1 as a match key, the customer resolution engine favors smaller cliques over larger cliques and favors lower-weight cliques over higher-weight cliques. In this example, the algorithm variable k equals 1 and the algorithm variable W equals 1.

Having identified each node associated with a first count, each node associated with the first count is deleted, block 206. The database system deletes each one-node clique that was identified as a match key. In embodiments, this can include the customer resolution engine deleting the node 114, which also deletes the edges 132 and 134 that connect the node 114 to other nodes, from the graph 100 depicted by FIG. 1A, thereby creating the graph 136 depicted by FIG. 1B. By deleting the clique that is the node 114 which was identified as a match key, the customer resolution engine discards all cliques that are proper supersets of the node 114 as candidates for being match keys.

Figure 1B:
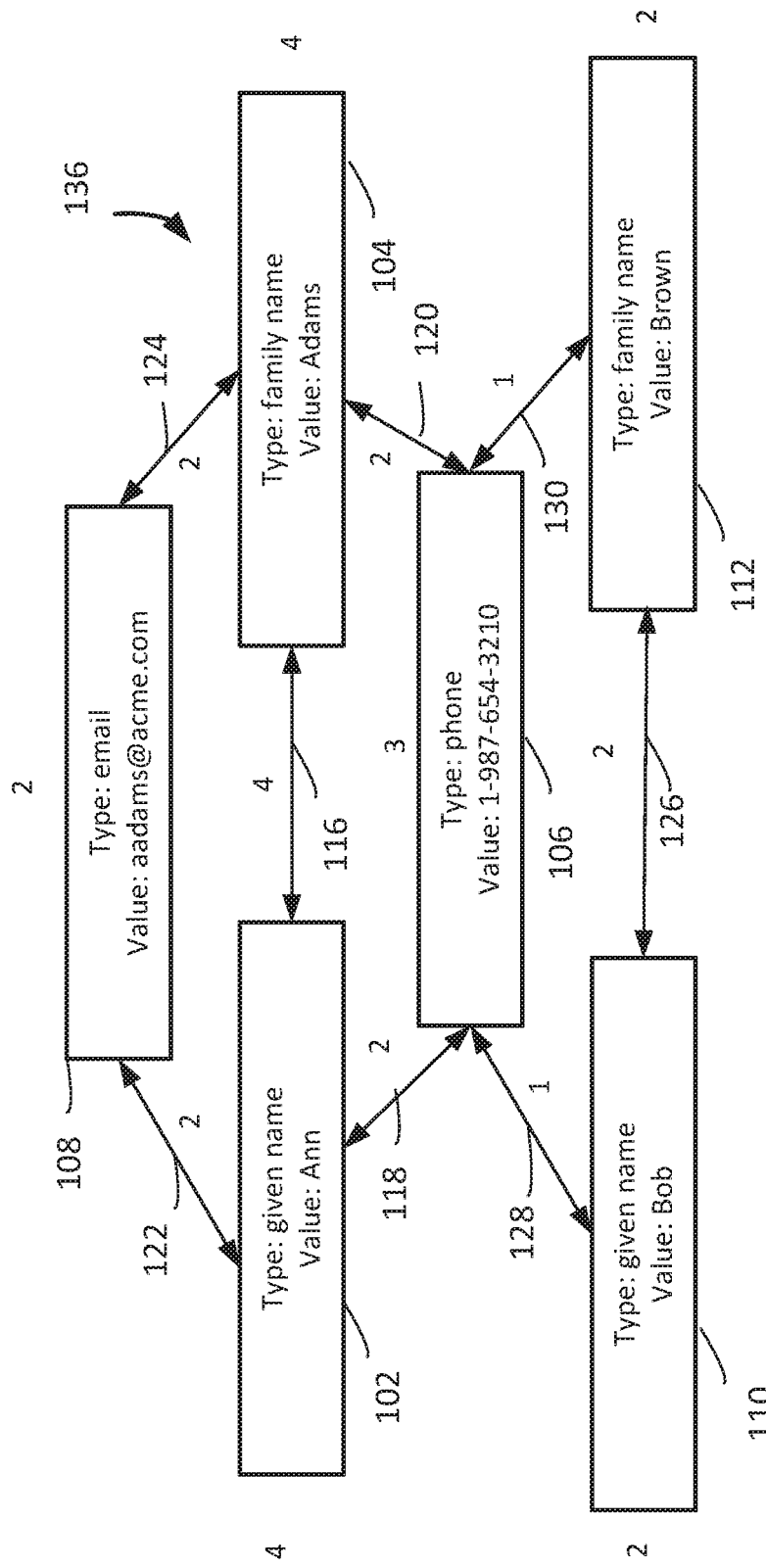
Figure 1C:
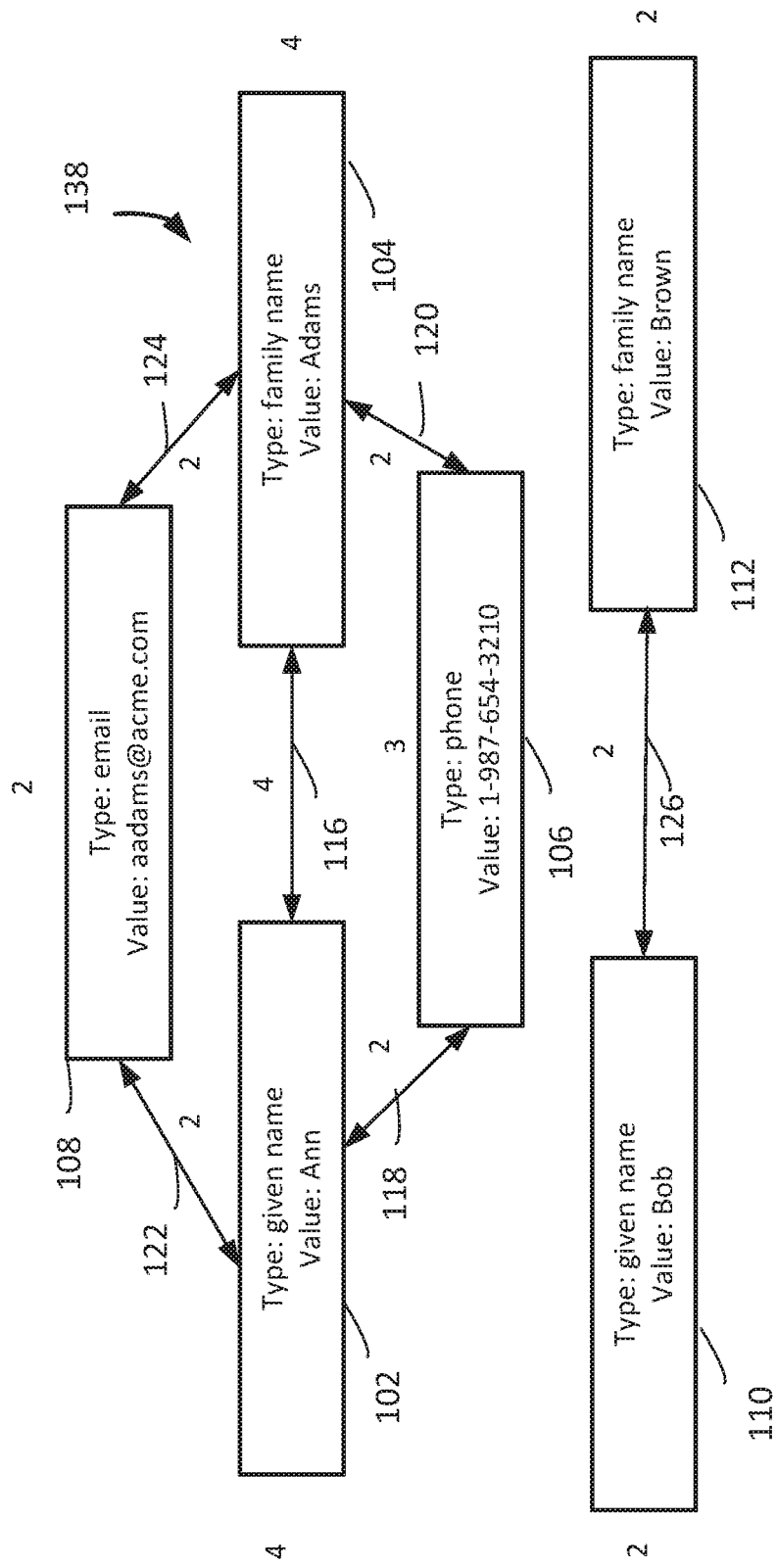
Figure 1D:
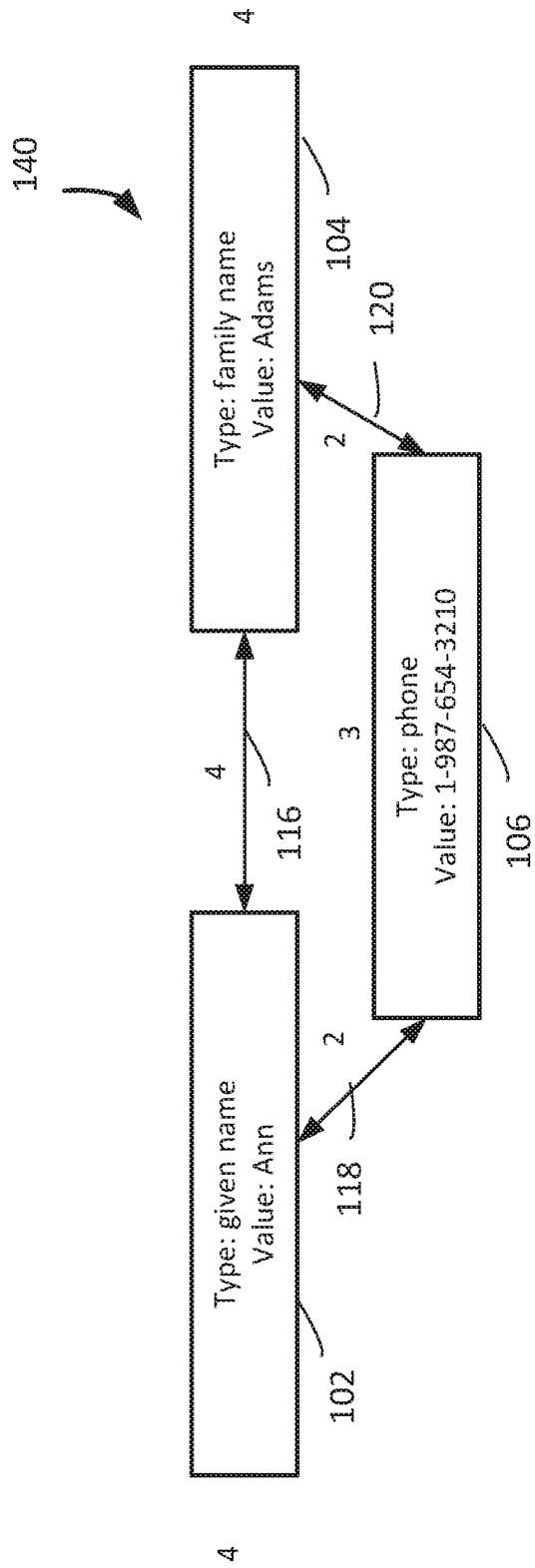

Following the creation of a graph, each edge associated with a second count is identified as a second set of keys, block 208. The database system identifies each double node clique connected by an edge with the weight of one as a match key. For example, and without limitation, this can include the customer resolution engine identifying the edge 128 that has a weight of 1 and connects the nodes 110 and 106 as the match key {Bob, 1-987-654-3210}, and the edge 130 that has a weight of 1 and connects the nodes 112 and 106 as the match key {Brown, 1-987-654-3210}, as depicted by FIG. 1B. The customer resolution engine would have identified the edges 132 and 134 that have the weights of 1 as match keys, as depicted by FIG. 1A, but the customer resolution engine already deleted the edges 132 and 134 when deleting the node 114 that was identified as a match key, such that the edges 132 and 134 are absent from the graph 136 depicted by FIG. 1B. When identifying the edges 128 and 130 with the weight of 1 as match keys, the customer resolution engine favors smaller cliques over larger cliques and favors lower-weight cliques over higher-weight cliques. In this example, the algorithm variable k equals 2 and the algorithm variable W equals 1. The second count is at least the first count. For example, the second count and the first count both have the value of 1.

After identifying each edge associated with a second count, each edge associated with the second count is deleted, block 210. The database system deletes each edge that was identified as a match key. By way of example and without limitation, this can include the customer resolution engine deleting the edges 128 and 130 from the graph 136 depicted by FIG. 1B. Consequently, the customer resolution engine's deletions create the graph 138 depicted by FIG. 1C. By deleting the cliques that are the edges 128 and 130 which were identified as match keys, the customer resolution engine discards all cliques that are proper supersets of the edges 128 and 130 as candidates for being match keys.

Following the creation of a graph, each node associated with a third count is identified as a third set of keys, block 212. The database system identifies each single node clique with the weight of two as a match key. In embodiments, this can include a customer resolution engine identifying the node 108 as the match key {aadams@acme.com}, the node 110 as the match key {Bob}, and the node 112 as the match key {Brown}. When identifying the nodes 108, 110, and 112 with the weight of 2 as match keys, the customer resolution engine favors smaller cliques over larger cliques and favors lower-weight cliques over higher-weight cliques. In this example, the algorithm variable k equals 1 and the algorithm variable W equals 2. The third count is at least the second count. For example, the third count equals 2 and the second count equals 1.

Having identified each node associated with a third count, each node associated with the third count is deleted, block 214. The database system deletes each one-node clique that was identified as a match key. For example, and without limitation, this can include the customer resolution engine deleting the nodes 108, 110, and 112, which also deletes the edges 122 and 124 that connect the node 108 to other nodes, and the edge 126 that connects the nodes 110 and 112, from the graph 138 depicted by FIG. 1C, thereby creating the graph 140 depicted by FIG. 1D. By deleting the cliques that are the nodes 108, 110, and 112 which were identified as match keys, the customer resolution engine discards all cliques that are proper supersets of the node 108, 110, and 112 as candidates for being match keys.

After creating a graph, each edge associated with a fourth count is identified as a fourth set of keys, block 216. The database system identifies each double node clique connected by an edge with the weight of 2 as a match key. By way of example and without limitation, this includes the customer resolution engine identifying the edge 118 that has a weight of 2 and connects the nodes 102 and 106 as the match key {Ann, 1-987-654-3210}, and the edge 120 that has a weight of 2 and connects the nodes 104 and 106 as the match key {Adams, 1-987-654-3210}. In this example, the algorithm variable k equals 2 and the algorithm variable W equals 2. The fourth count is at least the third count. For example, the fourth count equals 2 and the third count equals 2.

Figure 1E:
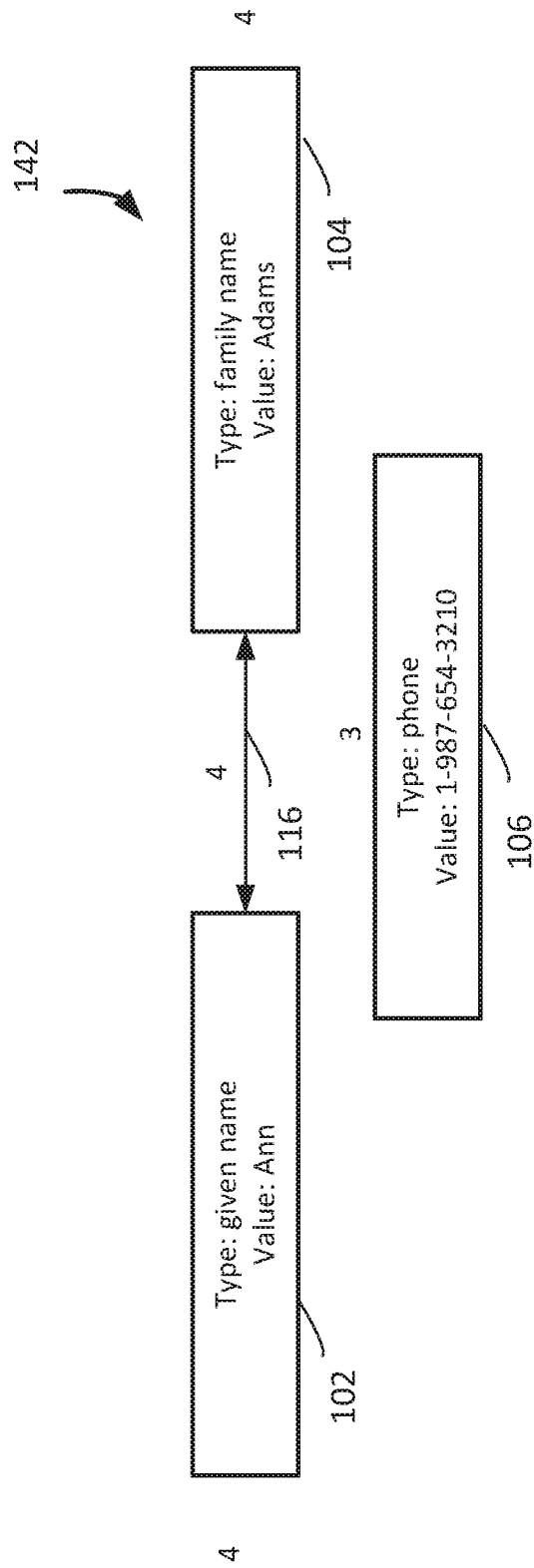

Following the identification of each edge associated with a fourth count, each edge associated with the fourth count is deleted, block 218. The database system deletes each edge that was identified as a match key. In embodiments, this includes the customer resolution engine deleting the edges 118 and 120 from the graph 140 depicted by FIG. 1D, thereby creating the graph 142 depicted by FIG. 1E. By deleting the edges 118 and 120 which were identified as match keys, the customer resolution engine discards all cliques that are proper supersets of the edges 118 and 120 as candidates for being match keys.

Having created a graph, each pair of edges connected by a corresponding node and collectively associated with a fifth count are optionally identified as a fifth set of keys, block 220. The database system can identify each pair of edges that are connected by a node and that have a weight of 2 as a match key. For example, and without limitation, this could have included the customer resolution engine identifying the edges 132 and 134 that are connected by the node 114, which are a clique with the edge weights of 2, as the match key {Bob, bbrown@acme.com, Brown} if the customer resolution engine had not already deleted these edges 132 and 134 and the node 114. In this example, the algorithm variable k equals 3 and the algorithm variable W equals 2.

After identifying each pair of edges connected by a corresponding node and collectively associated with a fifth count, each pair of edges connected by the corresponding node and collectively associated with the fifth count are optionally deleted, block 222. The database system deletes each edge that was identified as a match key. By way of example and without limitation, this could have included the customer resolution engine deleting the edges 132 and 134 that are connected by the node 114, if the customer resolution engine had not already deleted these edges 132 and 134.

Following the creation of a graph, each node associated with a sixth count is optionally identified as a sixth set of keys, block 224. The database system identifies each single node clique with the weight of 3 as a match key. In embodiments, this includes a customer resolution engine identifying the node 106 that has a weight of 3 as the match key {1-987-654-3210}. In this example, the algorithm variable k equals 1 and the algorithm variable W equals 3. The sixth count is at least the fifth count. For example, the sixth count equals 3 and the fifth count equals 2.

Having identified each node associated with a sixth count, each node associated with the sixth count is optionally deleted, block 226. The database system deletes each one-node clique that was identified as a match key. For example, and without limitation, this could have included the customer resolution engine deleting the node 106 from the graph 142 depicted by FIG. 1E, thereby creating the graph 144 depicted by FIG. 1F.

Figure 1F:
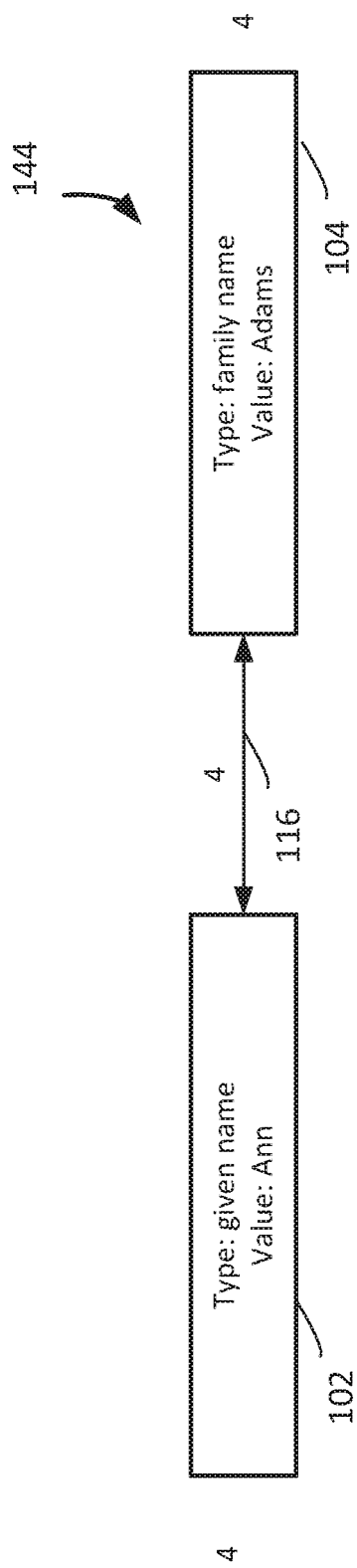

After creating a graph, each edge associated with a seventh count is optionally identified as a seventh set of keys, block 228. The database system identifies each double node clique connected by an edge with the weight of 3 as a match key. By way of example and without limitation, this could have included the customer resolution engine identifying the edge 116 that connects the nodes 102 and 104 as the match key {Ann, Adams}, as depicted by FIG. 1F, if edge 116 that connects the nodes 102 and 104 had the weight of 3. In this example, the algorithm variable k equals 2 and the algorithm variable W equals 3. The seventh count is at least the sixth count. For example, the seventh count equals 3 and the sixth count equals 3.

Following the identification of each edge associated with a seventh count, each edge associated with the seventh count is optionally deleted, block 230. The database system deletes each edge that was identified as a match key. In embodiments, this could have included the customer resolution engine deleting the edge 116 from the graph 144 depicted by FIG. 1F, if the edge 116 that connects the nodes 102 and 104 had the weight of 3.

Having created a graph, each pair of edges connected by a corresponding node and collectively associated with an eighth count is optionally identified as an eighth set of keys, block 232. The database system can identify each pair of edges that are connected by a node and that have a specified weight as a match key. For example, and without limitation, this could have included the customer resolution engine identifying the edges 118 and 120 that are connected by the node 106, which is a clique with the edge weights of 4, as the match key {Ann, 1-987-654-3210, Adams}, if the these edges 118 and 120 that connect the node 106 had the weight of 3. In this example, the algorithm variable k equals 3 and the algorithm variable W equals 3. The eighth count is at least the seventh count. For example, the eighth count equals 3 and the seventh count equals 3.

After identifying each pair of edges connected by a corresponding node and collectively associated with an eighth count, each pair of edges connected by a corresponding node and collectively associated with the eighth count is optionally deleted, block 234. The database system deletes each edge that was identified as a match key. By way of example and without limitation, this could have included the customer resolution engine deleting the edges 118 and 120 that are connected by the node 106, if edges 118 and 120 had the weight of 3. Although the preceding examples described the identification of match keys starting with a clique that has one node and the weight or count of 1 and ending with cliques that have the three nodes and the weight or count of 3, the identification of match keys can continue with cliques that have any number of nodes and weights or counts of any number. For example, the customer resolution engine identifies the node 102 that has a weight of 4 as the match key {Ann} and the node 104 that has a weight of 4 as the match key {Adams}. In this example, the algorithm variable k equals 1 and the algorithm variable W equals 4. Continuing this example, the customer resolution engine deletes the nodes 102 and 104 from the graph 144 depicted by FIG. 1F, which also deletes the edge 116 that connects the nodes 102 and 104, such that the match key generation is completed because the graph 144 is empty.

Following the identification of each set of keys, each set of keys is used to search and match records, block 236. The database system uses the match keys to identify existing database records that match a newly received database record. In embodiments, this can include the customer resolution engine using only the match key {bbrown@acme.com} of the match keys {bbrown@acme.com}, {Bob, 1-987-654-3210}, {Brown, 1-987-654-3210}, {aadams@acme.com}, {Bob}, {Brown}, {Ann, 1-987-654-3210}, {Adams, 1-987-654-3210}, {1-987-654-3210}, {Ann}, and {Adams} to efficiently search and match MegaCorp's existing records for Bob Brown when Bob Brown enters his name and email address when visiting MegaCorp's customer service website. By using the match keys in the order that the match keys were identified, the customer resolution engine favors smaller cliques over larger cliques and favors lower-weight cliques over higher-weight cliques. The customer resolution engine generates match keys that have a near-perfect recall (they almost never miss any matches) while being orders of magnitude faster than a naive approach that would deep-match all pairs of database records. A record can be the storage of at least one value in a persistent form.

The method 200 may be repeated as desired. Although this disclosure describes the blocks 202-236 executing in a particular order, the blocks 202-236 may be executed in a different order. In other implementations, each of the blocks 202-236 may also be executed in combination with other blocks and/or some blocks may be divided into a different set of blocks.

System Overview

Figure 3:
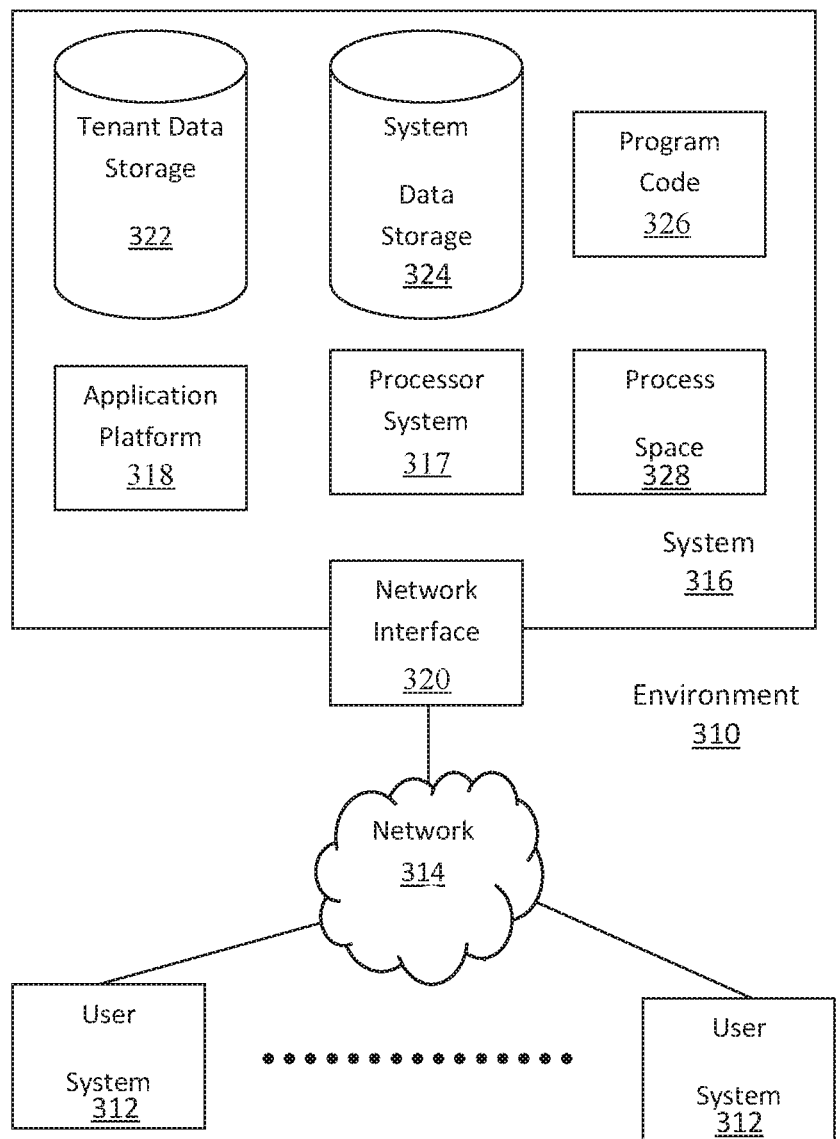
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
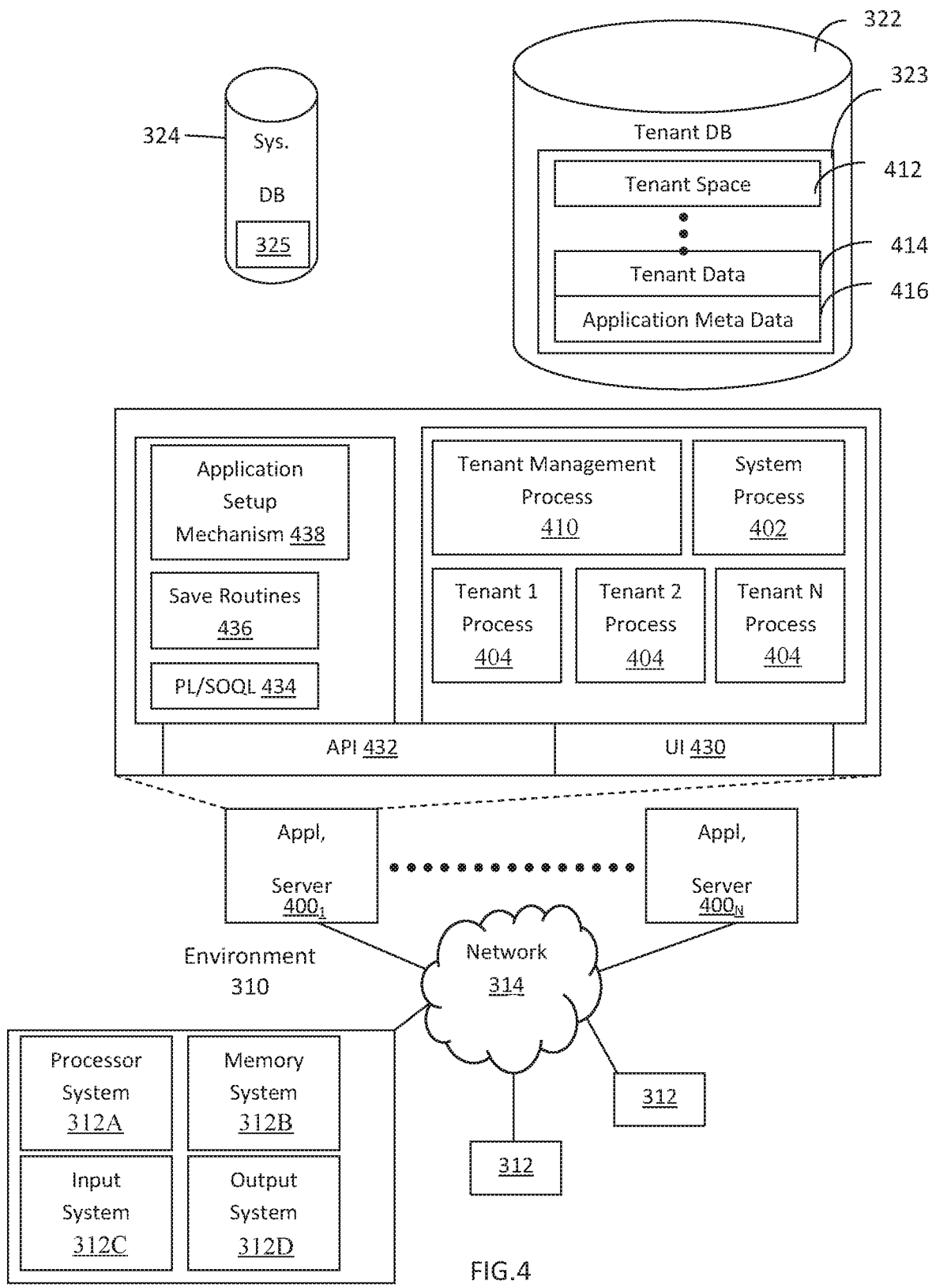
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 400$_1$-400$_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
create a graph of nodes connected by edges based on a set of database records stored in a database associated with the system, wherein each node represents a value of a corresponding attribute and is associated with a count of instances that the value is represented by the node, and each edge is associated with a count of instances that values represented by corresponding connected nodes are associated with each other;
identify each node, which is associated with a first count of instances that the node represents a corresponding value, as a first set of keys;
delete each node associated with the first count;
identify each edge associated with a second count as a second set of keys;
delete each edge associated with the second count;
identify each node associated with a third count as a third set of keys,
delete each node associated with the third count;
identify each edge associated with a fourth count as a fourth set of keys;
delete each edge associated with the fourth count; and
use the identified sets of keys, in an order that the sets of keys were identified, until a key matches an attribute value of a newly-received database record, wherein the matched key identifies a node that represents an only subset of existing database records, from the set of database records, that store multiple attributes which require determining whether matches exist with multiple attributes of the newly-received database record.

2. The system of claim 1, wherein the second count is at least the first count, the third count is at least the second count, and the fourth count is at least the third count.

3. The system of claim 1, comprising further instructions, which when executed, cause the one or more processors to:
identify each pair of edges connected by a corresponding node and collectively associated with a fifth count as a fifth set of keys; and
delete each pair of edges connected by the corresponding node and collectively associated with the fifth count, wherein the fifth count is at least the fourth count.

4. The system of claim 3, comprising further instructions, which when executed, cause the one or more processors to identify each node associated with a sixth count as a sixth set of keys; and
delete each node associated with the sixth count, wherein the sixth count is at least the fifth count.

5. The system of claim 4, comprising further instructions, which when executed, cause the one or more processors to identify each edge associated with a seventh count as a seventh set of keys; and
delete each edge associated with the seventh count, wherein the seventh count is at least the sixth count.

6. The system of claim 5, comprising further instructions, which when executed, cause the one or more processors to identify each pair of edges connected by a corresponding node and collectively associated with an eighth count as an eighth set of keys; and
delete each pair of edges connected by the corresponding node and collectively associated with the eighth count, wherein the eighth count is at least the seventh count.

7. The system of claim 1, wherein the records are stored by at least one of different departments of an enterprise and different tenants in a multi-tenant database.

8. A computer program product comprising computer-readable program code to be executed by one or more processors when retrieved from a non-transitory computer-readable medium, the program code including instructions to:
create a graph of nodes connected by edges based on a set of database records stored in a database associated with the system, wherein each node represents a value of a corresponding attribute and is associated with a count of instances that the value is represented by the node, and each edge is associated with a count of instances that values represented by corresponding connected nodes are associated with each other;
identify each node, which is associated with a first count of instances that the node represents a corresponding value, as a first set of keys;
delete each node associated with the first count;
identify each edge associated with a second count as a second set of keys;
delete each edge associated with the second count;
identify each node associated with a third count as a third set of keys,
delete each node associated with the third count;

identify each edge associated with a fourth count as a fourth set of keys;

delete each edge associated with the fourth count; and use the identified sets of keys, in an order that the sets of keys were identified, until a key matches an attribute value of a newly-received database record, wherein the matched key identifies a node that represents an only subset of existing database records, from the set of database records, that store multiple attributes which require determining whether matches exist with multiple attributes of the newly-received database record.

9. The computer program product of claim 8, wherein the second count is at least the first count, the third count is at least the second count, and the fourth count is at least the third count.

10. The computer program product of claim 8, wherein the program code comprises further instructions to:

identify each pair of edges connected by a corresponding node and collectively associated with a fifth count as a fifth set of keys; and delete each pair of edges connected by the corresponding node and collectively associated with the fifth count, wherein the fifth count is at least the fourth count.

11. The computer program product of claim 10, wherein the program code comprises further instructions to:

identify each node associated with a sixth count as a sixth set of keys; and delete each node associated with the sixth count, wherein the sixth count is at least the fifth count.

12. The computer program product of claim 11, wherein the program code comprises further instructions to:

identify each edge associated with a seventh count as a seventh set of keys; and delete each edge associated with the seventh count, wherein the seventh count is at least the sixth count.

13. The computer program product of claim 12, wherein the program code comprises further instructions to:

identify each pair of edges connected by a corresponding node and collectively associated with an eighth count as an eighth set of keys; and delete each pair of edges connected by the corresponding node and collectively associated with the eighth count, wherein the eighth count is at least the seventh count.

14. The computer program product of claim 8, wherein the records are stored by at least one of different departments of an enterprise and different tenants in a multi-tenant database.

15. A method comprising:

creating a graph of nodes connected by edges based on a set of database records stored in a database associated with the system, wherein each node represents a value of a corresponding attribute and is associated with a count of instances that the value is represented by the node, and each edge is associated with a count of instances that values represented by corresponding connected nodes are associated with each other;

identifying each node, which is associated with a first count of instances that the node represents a corresponding value, as a first set of keys;

deleting each node associated with the first count;

identifying each edge associated with a second count as a second set of keys;

deleting each edge associated with the second count;

identifying each node associated with a third count as a third set of keys, deleting each node associated with the third count;

identifying each edge associated with a fourth count as a fourth set of keys;

deleting each edge associated with the fourth count; and use the identified sets of keys, in an order that the sets of keys were identified, until a key matches an attribute value of a newly-received database record, wherein the matched key identifies a node that represents an only subset of existing database records, from the set of database records, that store multiple attributes which require determining whether matches exist with multiple attributes of the newly-received database record.

16. The method of claim 15, wherein the second count is at least the first count, the third count is at least the second count, and the fourth count is at least the third count.

17. The method of claim 15, the method further comprising:

identifying each pair of edges connected by a corresponding node and collectively associated with a fifth count as a fifth set of keys; and deleting each pair of edges connected by the corresponding node and collectively associated with the fifth count, wherein the fifth count is at least the fourth count.

18. The method of claim 16, the method further comprising:

identifying each node associated with a sixth count as a sixth set of keys; and deleting each node associated with the sixth count, wherein the sixth count is at least the fifth count.

19. The method of claim 17, the method further comprising:

identifying each edge associated with a seventh count as a seventh set of keys; and deleting each edge associated with the seventh count, wherein the seventh count is at least the sixth count.

20. The method of claim 18, the method further comprising:

identifying each pair of edges connected by a corresponding node and collectively associated with an eighth count as an eighth set of keys; and deleting each pair of edges connected by the corresponding node and collectively associated with the eighth count, wherein the eighth count is at least the seventh count.

\* \* \* \* \*